United States Patent [19]

Igarashi et al.

[11] 3,967,027
[45] June 29, 1976

[54] STABLE ELECTRET RETAINING A HIGH SURFACE POTENTIAL AND METHOD OF MAKING THE SAME

[75] Inventors: Yuriko Igarashi, Musashino; Haruko Kakutani, Tokyo, both of Japan

[73] Assignee: Kureha Kagaku Kogyo Kabushiki Kaisha, Tokyo, Japan

[22] Filed: May 8, 1974

[21] Appl. No.: 468,102

Related U.S. Application Data

[63] Continuation-in-part of Ser. No. 99,974, Dec. 21, 1970, abandoned.

[30] Foreign Application Priority Data

Dec. 19, 1969   Japan............................ 44-101622

[52] U.S. Cl................................. 428/212; 156/272; 156/297; 156/334; 179/111 E; 204/165; 307/88 ET; 428/213; 428/215; 428/334; 428/335; 428/336; 428/409; 428/412; 428/421; 428/480; 428/483; 428/520; 428/522

[51] Int. Cl.²....................... B32B 7/02; B32B 7/04; B32B 31/12

[58] Field of Search............... 117/161 UF; 156/272, 156/334, 299, 300, 297; 161/183, 166; 179/111 E; 307/88 ET; 310/2, 8; 428/212, 412, 480, 483, 520, 522, 421, 334, 336, 335, 213, 215, 409; 204/165, 168, 169

[56] References Cited

UNITED STATES PATENTS

| 2,740,184 | 4/1956  | Thomas .......................... 307/88 ET |
| 3,000,735 | 9/1961  | Gunning ......................... 307/88 ET |
| 3,154,428 | 10/1964 | Cochrane........................... 117/161 |
| 3,380,983 | 4/1968  | Siegart.............................. 117/161 |
| 3,390,104 | 7/1968  | Miller ............................... 117/161 |
| 3,449,093 | 6/1969  | Baxt................................ 307/88 ET |
| 3,458,713 | 7/1969  | Perlman ......................... 179/111 E |
| 3,612,778 | 4/1970  | Murphy........................... 179/111 E |
| 3,755,043 | 8/1973  | Igarashi.......................... 179/111 E |

FOREIGN PATENTS OR APPLICATIONS 1,218,730   1/1971   United Kingdom

*Primary Examiner*—William J. Van Balen
*Assistant Examiner*—Ellis P. Robinson
*Attorney, Agent, or Firm*—Sughrue, Rothwell, Mion, Zinn & Macpeak

[57] ABSTRACT

A layered electret retaining a high surface potential for a prolonged period of time or substantially permanently consisting of a laminate of a plurality of unit electrets which are formed of a sheet of a synthetic plastic material, each side of the laminate having been covered by a thin film of a high molecular weight substance having a higher electric resistivity than that of the material of the unit electrets. In one modification, the thin film of the high molecular weight substance has been, in addition, interposed between adjacent unit electrets.

12 Claims, 12 Drawing Figures

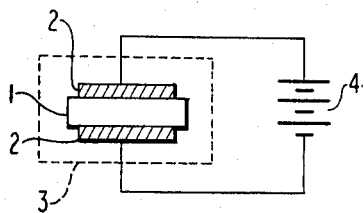
FIG. 1
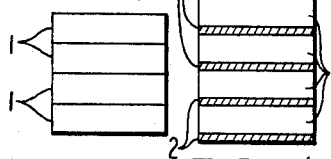
FIG. 2(a)  FIG. 2(c)
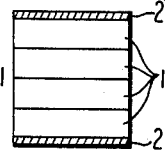
FIG. 2(b)
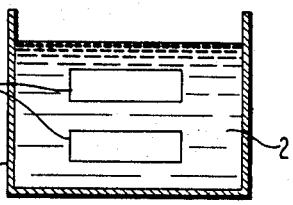
FIG. 4(b)
FIG. 4(a)
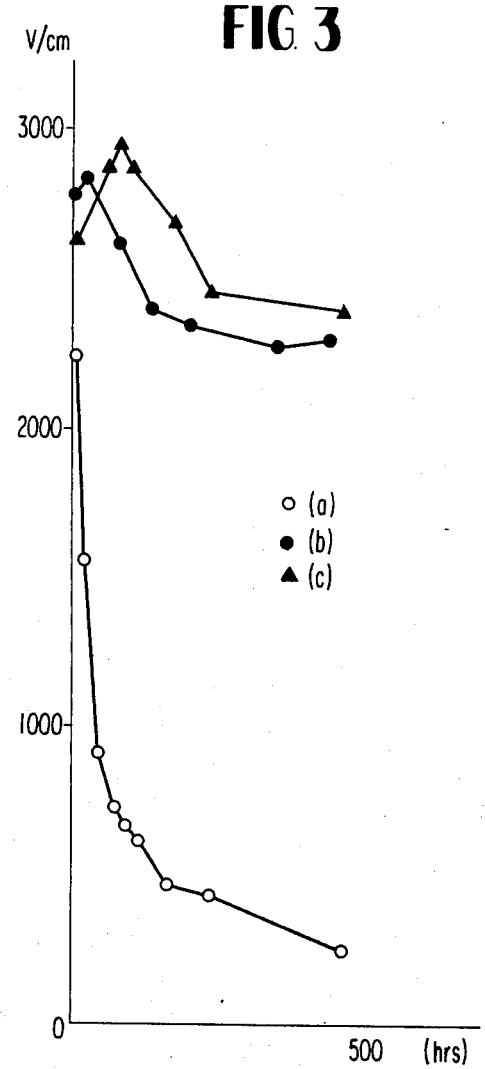
FIG. 3
INVENTORS
YURIKO IGARASHI
HARUKO KAKUTANI
BY Sughrue, Rothwell, Mion, Zinn & Macpeak
ATTORNEYS

STABLE ELECTRET RETAINING A HIGH SURFACE POTENTIAL AND METHOD OF MAKING THE SAME

RELATIONSHIP TO OTHER APPLICATIONS

This application is a continuation-in-part application of Ser. No. 99,974, filed Dec. 21, 1970, now abandoned.

BACKGROUND OF THE INVENTION

1. Field of the Invention

The invention relates to a layered electret retaining a high surface potential and a method of making the same from synthetic high molecular weight substances.

2. Description of the Prior Art

Electrets made out of a plastic sheet of film consisting of a low molecular weight organic compound, such as carnauba wax or naphthalene, a non-crystalline high molecular weight compound, such as poly(methyl methacrylate) or polystyrene, a crystalline high molecular weight compound, such as poly(ethylene terephthalate), polycarbonates, poly(fluorinated ethylenes) or polypropylene, or a copolymer or mixtures thereof, made by holding the sheet or film at a proper high temperature for a long period of time and then cooling it to room temperature while imposing thereto a high voltage of direct current through the heating and cooling stages, retain their polarized state for a long period of time, so that a variety of uses therefor, e.g., in speakers, microphones and like electricity-sound converters, or in other electronic appliances, have been taken into consideration. Especially, suitable materials used in forming electrets of relatively long life are polar high molecular weight compounds; such as, e.g., poly(-methyl methacrylate), poly(ethylene terephthalate), polycarbonates or polar fluoro resins. However, electrets formed of such materials do not always retain a high enough surface potential for application in an electricity-sound converter or other electronic appliance.

Although it is necessary in obtaining an electret having a high surface potential to use an electret material of a sufficient thickness, the use of a thick electret material is unpractical, since it requires an electric field of a high voltage for polarization. Therefore, it is common in methods of producing electrets having a high surface potential to convert a relatively thin plastic sheet material in a conventional manner to an electret and then building up the electret in layers. In many cases, the electret is put in use under conditions which are more adverse than the ordinary storage conditions, e.g., under high temperature conditions compared to room temperature, and, under such injurious conditions, even electrets formed of the above-mentioned plastic material, which have hitherto been considered to be relatively stable, cannot always retain their function for a long period of time.

Accordingly, it is the primary object of the present invention to provide an electret which obviates the aforementioned disadvantages.

Other objects and advantages will become apparent from the ensuing description.

SUMMARY OF THE INVENTION

According to the present invention, layered electrets having a remarkably improved life under high temperature and high humidity conditions, as well as under ordinary storage conditions, may be obtained, by providing a method of manufacturing electrets having a high surface potential. The present invention provides a process of preparing electrets comprising forming a laminate of relatively thin unit electrets, and covering both sides of the laminate electret with a thin film of a high molecular weight substance having a high electric insulation property and, optionally, also interposing such a thin film between adjacent layers of the unit electrets. The same result will be obtained by coating only one or both surfaces of the electret material with the thin film of the high molecular weight substance having a high electric insulation property, then converting the coated electret material into a unit electret in a conventional manner and finally forming a laminate of two or more layers of the unit electrets. While there is no restriction with respect to the number of layers of the unit electrets, 1 to 10 layers are preferred since the surface potential is substantially proportional to the number of layers.

BRIEF DESCRIPTION OF THE DRAWINGS

FIG. 1 is a schematic view of apparatus which may be used in the manufacture of the unit electret used in the practice of the present invetion;

FIG. 2(a) and FIGS. 2(b) and 2(c) are elevational views in section of a prior art electret and the layered electret of the present invention, respectively, illustrating various modes of the lamination of the electrets or the unit electrets and the insulation film;

FIG. 3 is a graph indicating the variation of the surface potentials of the three layered electrets (a), (b) and (c) corresponding, respectively, to FIGS. 2(a), 2(b) and 2(c);

FIGS. 4(a) and 4(b) are schematic views in section indicating the manner of laminating two unit electrets while forming thereon an insulation film.

DESCRIPTION OF THE PREFERRED EMBODIMENTS

Figure 5A:
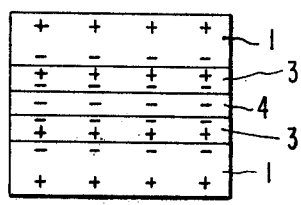
FIGS. 5A–C presents cross sectional views of applicants' layered electret and two prior art layered electrets, as described in comparative Example 6 of this application.

In the practice of the present invention, any suitable polar high molecular weight substance and, in addition, also polyethylene, polyproplyene and other like nonpolar high molecular weight substances may be used as the electret material, with the proviso that the nonpolar high molecular weight substance can be converted to an electret by the aid of an ionic impurity contained therein; but preferably, the ones used have high softening temperatures. Although there is no limitation with respect to the thickness of the unit electret, the electret sheets employed usually have a thickness of from 50 microns to 2,000 microns.

The thin film of the high molecular weight substance to be applied to both sides of the laminate or, alternatively, also interposed between layers of the laminate, may be a self-sustaining thin film which has previously been prepared by a conventional film-forming technique or which may be directly formed on the surfaces of the unit electret or electret material from a solution in a suitable solvent. In the latter case, the solution will serve as a binder for the layers of the unit electrets or electret material.

The high molecular weight substance forming the thin film should, of course, be different from the high molecular weight substance of which the unit electret is formed and should have a higher electrical insulation property than the latter, and preferably has a volume resistivity of at least $10^{15}$ ohm-cm; more desirably, a volume resistivity of at least $10^{17}$ ohm-cm. The thickness of the thin film is not especially limited; the films usually used have a thickness of from 4 microns to 100 microns.

The layered electret thus obtained has a higher surface potential and stability than the layered electret which has been produced by the same procedure but without the use of the covering film of the present invention.

The present invention will be illustrated in more detail by reference to the following examples which should be read in conjunction with the drawings.

EXAMPLE 1

A 700 microns-thick sheet 1, formed of a mixture of 60 parts by weight of polyvinylidene fluoride (hereinafter referred to as "PVDF") and 40 parts by weight of poly(methyl methacrylate) (hereinafter referred to as "PMMA"), was interposed between electrodes 2,2 in oven 3, as shown in FIG. 1, and heated at 100°C for 1 hour and then cooled to room temperature while electrodes 2,2 were connected to direct current electric source 4 to form therebetween an electric field of a gradient of 50 KV/cm. After removal of the electric field, a laminate was formed of four pieces of unit electret 1 thus-obtained and pieces of a 13 microns-thick film 2' of F.E.P. Teflon (polytetrafluoroethylene supplied by E.I. Du Pont de Nemours)—i.e., the Teflon layers were disposed on the top and bottom surfaces of the laminate and interposed between the layers of the unit electrets 1—as shown in FIG. 2(b). The layered electret thus-formed was wrapped in a tin foil and held in air at 80°C in thermostat 3 as shown in FIG. 1 and the surface potential was measured by means of a sector-type potentiometer to determine the decay of the surface potential with time. The decay of the surface potential with time was as plotted as curve (b) in FIG. 3; where the plotted values were measured from the side facing the cathode, the values measured from the anode side being of an adverse sign but substantially identical in absolute value.

The surface potential of a layered electret formed of four pieces of unit electret 1 and having F.E.P. Teflon film 2 on both sides only, as shown in FIG. 2(c), was measured in the same manner. The decay of the surface potential measured from the cathode side was as plotted as curve (c) in FIG. 3.

The decay of surface potential measured on a layered electret consisting only of four pieces of unit electret 1, as shown in FIG. 2(a), was as indicated by curve (a) in FIG. 3.

EXAMPLE 2

Unit electrets 1, formed of a mixture of 60 parts by weight of PVDF and 40 parts by weight of PMMA, produced in the same manner as in Example 1 in apparatus as shown in FIG. 1, were passed through a vessel 3' containing a 10% solution 2 of polystyrene in benzene, as shown in FIG. 4(a) to apply the solution to the surfaces thereof and, while undried, two unit electrets were adhered to each other as shown in FIG. 4(b) and allowed to dry in air to obtain a layered electret having thin films 4' of polystyrene on its exterior and interior surfaces. The layered electret was then wrapped in a tin foil and held in air at 80°C in an oven and the surface potential of the electret was measured by means of a rotary sector-type potentiometer. After about 400 hours, the surface potential was ±2,230 V/cm. The surface potential, after about 400 hours of an electret produced in the same manner except that the unit electrets were not passed through the 10% benzene solution of polystyrene was 200 V/cm.

EXAMPLE 3

On a 700 microns-thick sheet formed of a mixture of 60 parts by weight of PVDF and 40 parts by weight of PMMA, there was formed a polystyrene film from a 10% solution of polystyrene in benzene. The coated sheet thus-formed was converted into an electret in the same manner as in Example 1 in apparatus as shown in FIG. 1. Four pieces of the unit electret thus-obtained were formed into a laminate, wrapped in tin foil, held in air at 80°C in an oven and the surface potential thereof was measured by means of a rotary sector-type potentiometer. The surface potential was, after a lapse of time of about 350 hours, ±2,200 V/cm.

The surface potential, after a lapse of time of about 350 hours, of a layered electret produced in the same manner, except that the unit electrets were not coated with the polystyrene film, was 160 V/cm.

EXAMPLE 4

A thin film of polystyrene was formed from a 10% solution of polystyrene in benzene on a PVDF sheet having a thickness of about 700 microns, and the coated sheet was converted into an electret by means of apparatus as shown in FIG. 1 in the same manner as in Example 1. Four pieces of the unit electret thus-formed were wrapped in tin foil and held in air at 80°C in an oven, and the surface potential thereof was measured. The surface potential, after a lapse of time of about 300 hours, as determined by means of a rotary sector-type potentiometer, was ±1,500 V/cm.

The surface potential after a time lapse of about 300 hours, of a layered electret produced in the same manner, except that uncoated unit electrets were used, was substantially zero.

EXAMPLE 5

A PVDF sheet (about 700 microns thick) was subjected, at 120°C for 1 hour, to the action of a direct current electric field of a gradient of 50 KV/cm and cooled to room temperature in the electric field. After being passed through a 10% solution of polystyrene in benzene, two pieces of the resulting coated unit electret were combined in layers while yet undried and allowed to dry in air. The layered electret thus-formed was wrapped in tin foil and held in air at 80°C and the surface potential thereof was measured by means of a rotary sector-type potentiometer. The surface potential after a time lapse of about 300 hours was ±1,000 V/cm. On the other hand, a layered electret made out of the same unit electrets, except that the unit electrets were not coated with the polystyrene solution, exhibited a surface potential of substantially zero, after a time lapse of about 300 hours.

EXAMPLE 6

For this experiment, a series of unit electrets were prepared as follows:

Electrets were formed from press-sheets about 1 millimeter in thickness, formed of a mixture of 70 parts by weight of polyvinylidene fluoride and 30 parts by weight of polymethyl methacrylate, held between electrodes in an oven to form an electric field of a DC voltage of 50KV/cm at 120°C. for one hour. After being cooled to room temperature, the applied electric field was removed. Then, one surface of the press-sheet electret for study as a unit electret according to Baxt et al. U.S. Pat. No. 3,449,093 was silver-deposited to have a conductive layer. The press-sheet for a unit electret according to the teachings of Baxt et al. with Murphy, U.S. Pat. No. 3,612,778 was first covered with a polystyrene layer about 30 microns in thickness and further silver-deposited on one surface thereof to form a negatively charged surface.

Figure 5B:
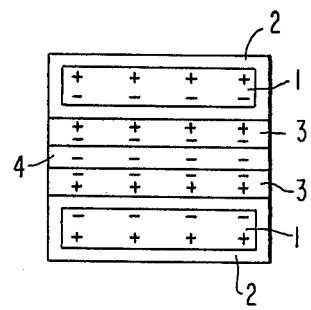
Figure 5C:
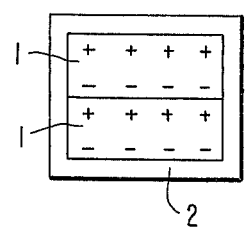

By employing two samples of each of the above electrets, three electretd A, B and C were prepared, as illustrated in cross sectional view in FIG. 5 of the application.

Electret A was made from two Baxt et al. electrets where the conductive layers silver-deposited on the two unit electrets, each having the same negative surface polarity, were adhered to one another by means of an adhesive of a negative electrical resistance less than 10 ohm-cm.

Electret B was made from two Baxt et al. with Murphy electrets by adhering the silver-deposited conductive layers of the unit electrets each having the same surface polarity to one another by means of the above-noted adhesive. As noted, the unit electrets were coated with polystyrene of an electrical volume resistivity of $10^{18}$-$10^{20}$ ohm-cm prior to application of the silver-deposited conductive layers.

Electret C was an electret of the present invention obtained by facing the surfaces of two press-sheet unit electrets in such a manner that the positive charge surface of one electret and the negative charge surface of the other are facing one another. The stacked unit electret is then coated with a polystyrene layer of 30 microns in thickness.

In FIG. 5 of the drawings, 1 designates the respective unit electret from which the layered electret is made, 2 designates a polystyrene layer, 3 designates a silver-deposited conductive layer and 4 designates an adhesive conductive layer.

Upon measuring the surface potential of the thus-obtained electrets A, B and C in an oven at 80°C, the results tabulated in the following Table 1 were obtained.

Table 1

|  | Electret A | Electret B | Electret C |
|---|---|---|---|
| Initial Voltage | 600 V | 1000 V | 2000 V |
| Voltage in 10 hrs. | 700 V | 1100 V | 2100 V |
| Voltage in 500 hrs. | 100 V | 800 V | 2000 V |

Figure 6A:
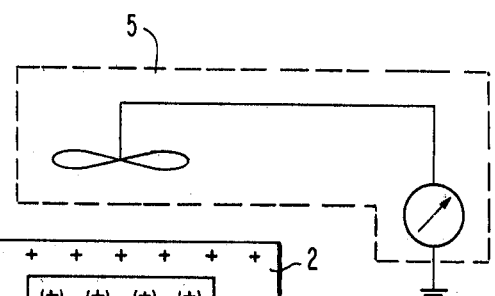
FIGS. 6A and B illustrate rotary sector-type potentiometers used to measure the surface potentials of the three electrets of FIG. 5, as described in Example 6.
Figure 6B:
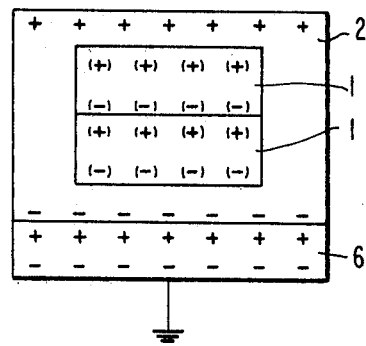
Figure 6B:
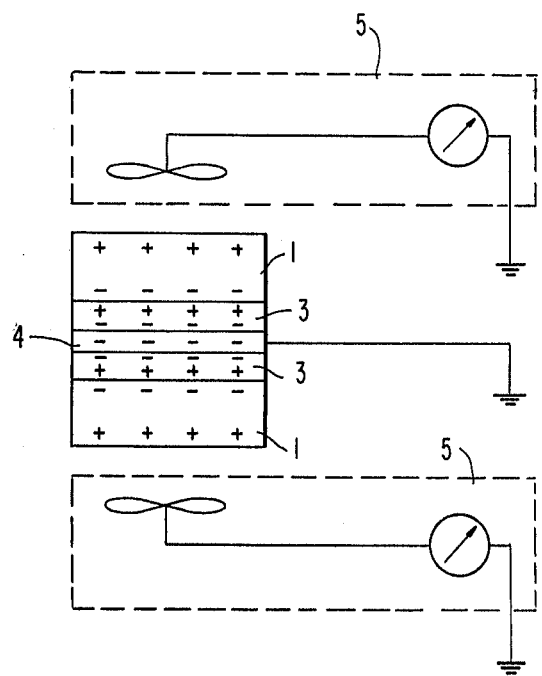

To obtain the above-tabulated measurements, the surface potential of each electret A, B and C was measured at a distance of 1 centimeter from the electrode of a rotary sector-type potentiometer as arranged in FIG. 6 of the drawings.

As is seen, the intial surface potential of the stacked electret C was 2000 volts, which is about two times the surface potential of the single electret.

Table 1 shows the variation in surface potential of the three stacked electrets (A, B and C) with passage of time while held in an oven at 80°C., as determined as discussed below.

With respect to electret B, in the absence of the silver conductive layer, the surface potential is 0 since the surface charges are of the same type.

It is seen and believed to be quite unexpected that applicants can obtain a stacked electret having a surface potential, for example, about equal to the sum of the surface potentials of the unit electrets comprising the stacked or layered electret without consideration of connections which are usually required in series battery combinations. Further, surface potential is maintained over extended periods of time.

Turning to FIG. 6, in the case of electrets A and B, two rotary sector-type potentiometers 5 were disposed at both charged surfaces of electrets A and B having the grounded conductive layers. In the case of electret C, a rotary sector-type potentiometer was disposed at one surface of the electret and the other surface was grounded by means of a conductive metal plate 6.

In order to compare the stability of the surface potential of each electret, it is most preferable to measure the variation of the surface potential of the electrets with the passage of time at actual working conditions, but this experiment was made under hastened conditions at higher temperature than room temperature because several years could not be waited. At 80°C. 10 hours is the period when the rise of the surface potential of an electret can be detected, and the surface potential after 500 hours can be said to correspond to that after one to several years.

As can be seen from the results set out above, the surface potential of electret A was the lowest and remarkably attenuated, that of electret B was low and its stability was rather improved, and that of electret C was excellent in both its height and stability.

It can be summarized that the present invention is excellent in the following three points.

First, an electret having a high surface potential can be obtained because the stacked unit electrets with no conductive layer therebetween function as if each unit electret is connected in series with the result that the surface potential increases almost in proportion to the number of unit electrets utilized. On the other hand, in a Baxt et al. electret, the surface potential of a unit electret only is obtained when the conductive layer is grounded. If a Baxt et al. electret is measured with the same method as that used with an electret of the present invention without grounding the conductive layer, no surface potential is obtained, which results in the neglection of the conductive layer.

The higher and more stable the surface potential of the electret is, the greater is the utilization range of the electret. For example, an electret having such a high surface potential can be directly employed for a head phone without the necessity of power from a transformer and may be also be applied to a large-sized loud speaker.

Second, the surface potential initially obtained remained stable for a longer period of time. In the present invention, the covering layer for the unit electrets concurrently words as an adhesive layer for the stacked unit electrets and, in addition, the surface potential can be remarkably maintained stable in addition to a mere water-proof effect, by employing a material of high electret volume resistivity such as polystyrene. The above excellent effect cannot be obtained by employing a material having low electric volume resistivity for an adhesive and a covering layer.

Third, the opposite polarities appear on both surfaces of the electret of the present invention as clearly seen from FIG. 5 of the drawings, one effect of which is that either positive or negative polarity can be utilized in accordance with the situation. Moreover, the surface potential of an electret can be retained in stable fashion without adsorbing any dust on the surface thereof during preservation since the surface potential does not apparently disappear. On the contrary, an electret of Baxt et al. is apt to generate an external electric field, which results in the attenuation of the surface potential due to dust adsorbed on the surface of the electret.

Polystyrene of a thickness of 4 to 100 microns is effective as a film coating layer for use in the present invention.

EXAMPLE 7

Two sheets of a single electret obtained by the aforementioned method "C" of Example 6 are dipped into a solution of 10 parts by weight of polystyrene and 90 parts by weight of benzene. Soon thereafter, while still wet, the positive charged surface of one electret and the negative charged surface of the other are faced with each other, which are covered with polystyrene film. After that, the stacked electret was dried for several minutes at the temperature of 30°-40°C. In thus obtained stacked electret, the thickness of the external surface layer and the thickness of adhesive surface layer were both about 20 microns. The surface potential between both surfaces of the stacked electrets was 1,800 V. Then, the stacked electret was put into an oven at 80°C. The result of measuring of the surface potential after the lapse of 500 hours was 1,600 V.

EXAMPLE 8

The positively charged surface of one electret and the negatively charged surface of the other are faced with each other by using two sheets of single electret obtained in the aforementioned method "C" of Example 6, which were covered with a polycarbonate film of 50 micron in thickness instead of the polystyrene film of Example 6. The surface potential between both surfaces of thus obtained stacked electret was 1,900 V. After putting the stacked electret into an oven at the temperature of 80°C., the stacked electrets were taken out after a lapse of 10 hours. The surface potential thereof was 2,000 V, similarly, the surface potential after the lapse of 500 hours was 1,900 V.

As is seen from the above examples, the stacked unit electrets, formed by facing surfaces having different electric charges to each other, covered with a polymer film having a higher electric-resistivity than that of electret base material, have a high stable surface potential of plural times the surface potential of the single electret.

What is claimed is:

1. A stabilized layer electret having a high surface potential consisting of a laminate of a plurality of unit electrets, free from metal layers, each unit electret is formed from a sheet of film of a first high molecular weight plastic substance selected from the group consisting of polymethyl (methacrylate), poly (ethylene terephthalate), polycarbonate, polyvinylidene fluoride and mixtures thereof, said unit electrets being laminated in such a manner that surfaces to be faced to each other have opposite charges, and insulation layers of a second high molecular weight plastic substance having an electrical volume resistivity on the order of at least $10^{15}$ ohm-cm having a higher electrical resistivity than said first plastic substance, said insulation layers having a a thickness of from 4 to 100 microns and being applied at least to both outer surfaces of said laminate.

2. The electret as defined in claim 1 wherein said unit electret is formed of a polar organic high molecular weight substance selected from the group consisting of polymethyl (methacrylate), poly(ethylene terephthalate), polycarbonate, and a mixture of polyvinylidene fluoride and polymethyl (methacrylate).

3. The electret as defined in claim 2 wherein the insulation layers are also disposed between adjacent unit electrets in said laminate.

4. the electret as defined in claim 1 in which the insulation layers are formed of polystyrene.

5. The electret as defined in claim 2 in which the insulation layers are formed of polystyrene.

6. In a method of producing a layered electret comprising forming a laminate of a plurality of unit electrets wherein each unit electret is formed from a sheet of film of a high molecular weight organic substance selected from the group consisting of polymethyl (methacrylate), poly(ethylene terephthalate), polycarbonate, polyvinylidene fluoride and mixtures thereof, the improvement which consists of laminating said unit electrets in such a manner that the surfaces facing one another are of opposite charges, and covering both outer surfaces of said laminate with a thin film of a high molecular weight organic substance having an electrical volume resistivity on the order of at least $10^{15}$ ohm-cm and an electrical volume resistivity higher than that of said polar high molecular weight organic substance.

7. In a method of producing a layer electret comprising forming a laminate of a plurality of unit electrets wherein each unit electret is formed of a organic high molecular weight substance selected from the group consisting of polymethyl (methacrylate), poly(ethylene terephthalate), polycarbonate, polyvinylidene fluoride and mixtures thereof, the improvement which consists of covering said unit electret with a thin film of an organic high molecular weight substnce having an electrical volume resistivity on the order of at least $10^{15}$ ohm-cm and an electrical volume resistivity higher than that of said polar high molecular weight organic substance and laminating said unit electrets in such a manner that the surfaces facing one another are of opposite charges.

8. The method for claim 7 wherein said organic high molecular weight substance is selected from the group consisting of polymethyl (methacrylate), poly(ethylene terephthalate), polycarbonate and a mixture of polyvinylidene fluoride and polymethyl(methacrylate).

9. The method of claim 6 wherein said high molecular weight subsstance is selected from the group consisting of polymethyl (methacrylate), poly(ethylene terephthalate), polycarbonate and a mixture of polyvinylidene fluoiride and polymethyl(methacrylate).

10. A method as defined in claim 8 wherein the solution is a 10% solution of polystyrene in benzene.

11. The method as defined in claim 8 wherein the thin film is applied from a solution in a suitable solvent of the organic high molecular weight substance.

12. The method as defined in claim 11 wherein a plurality of said unit electrets are coated with said solution, formed into a laminate while in an undried state and dried in air into a coherent body.

* * * * *